United States Patent [19]

Scothern

[11] 4,252,492
[45] Feb. 24, 1981

[54] DETACHABLE LIFT UNIT FOR PICKUP TRUCKS

[76] Inventor: Clinton Y. Scothern, 2629 N. 850 East, North Ogden, Utah 84404

[21] Appl. No.: 23,719

[22] Filed: Mar. 26, 1979

[51] Int. Cl.³ .............................................. B66F 7/16
[52] U.S. Cl. ................................... 414/541; 187/9 R
[58] Field of Search .............................. 414/540–545, 414/921; 244/137 R; 187/9 R

[56] References Cited

U.S. PATENT DOCUMENTS

| | | | |
|---|---|---|---|
| 2,949,197 | 8/1960 | Lomen | 414/545 |
| 3,180,503 | 4/1965 | Shaw | 414/540 |
| 3,233,758 | 2/1966 | Darfus | 414/540 |
| 3,520,426 | 7/1970 | Hostetler | 414/545 |
| 3,578,179 | 5/1971 | Fujioka | 414/543 X |
| 3,776,402 | 12/1973 | Bryan | 414/545 |
| 3,804,207 | 4/1974 | Stonebraker et al. | 187/9 R |
| 3,887,092 | 6/1975 | Leet | 414/545 |
| 3,899,089 | 8/1975 | Wardlaw | 414/543 |

Primary Examiner—Stephen G. Kunin
Assistant Examiner—Terrance L. Siemens
Attorney, Agent, or Firm—Terry M. Crellin

[57] ABSTRACT

An inexpensive, reliable lift unit is provided for a pickup truck wherein the lift unit is readily attached to and detached from the end of the bed of a pickup truck without the use of tools or other apparatus. There is no portion of the lift unit of this invention which is permanently or even semi-permanently attached to the truck. Th unit comprises a stationary support structure which rests on the bumper of the truck and has hook members connecting the upper portion thereof to the stake wells at the rear end of the bed of the truck or to the conventional tailgate of the truck. A load carrying platform is mounted to the support structure, with the platform being movable from a lowered position to an elevated position and vice-versa. The lift unit is adapted to support the load in its lifted position, without requiring movement of the load into the bed of the truck.

15 Claims, 10 Drawing Figures

DETACHABLE LIFT UNIT FOR PICKUP TRUCKS

BACKGROUND OF THE INVENTION

1. Field

The invention relates to tailgate lift mechanisms for pickup trucks. In particular, the invention is directed to lift apparatus which is readily and easily attached to and removed from the truck, so as to permit use of the truck for other purposes without the lift apparatus.

2. State of the Art

Many varieties of tailgate elevators or lift mechanisms are known in the art, but their use has been restricted due mainly because their constructions are unduly complex and expensive, or because they require at least semi-permanent attachment to the truck. Representative apparatus of the prior art is shown in U.S. Pat. Nos. 3,180,503; 3,520,426; 3,887,092; and the references cited therein.

3. Objectives

The principal objective of the present invention is to provide a simple, inexpensive lift unit which can be readily attached to and removed from the rear end of the bed of a pickup truck without requiring any permanent or even semi-permanent attachments to the truck. An additional objective is to provide a lift unit which is quickly and easily removed from the truck without the use of any tools or other attaching equipment. A further objective is to provide a lift unit which can be attached next to the standard, existing tailgate at the end of the truck bed without requiring removal of such tailgate. An even further objective is to provide a lift unit which is also adapted to carry the load thereon as the truck is operated on the highway.

SUMMARY OF THE INVENTION

The above objectives are achieved in accordance with the present invention by apparatus which is constructed as a unit adapted to rest on the bumper of the truck and hook members connecting the upper portion of the unit to the stake wells at the rear end of the bed of the truck or to the conventional tailgate of the truck.

The detachable lift unit of this invention includes a stationary support structure having a pair of spaced apart, essentially vertically disposed, elongate support members. An elongate, transverse, cross member extends between the upper ends of the support members. Means are provided for releasably mounting the lower ends of the support members to the bumper at the rear end of the truck. Preferably, the means for mounting the lower ends of the support members to the bumper comprises a pair of pin members attached to the lower ends, respectively, of the support members, with the pins being adapted to be received in corresponding openings in the upper surface of the back bumper of the pickup truck.

A pair of hook members are attached to the vertically disposed, elongate support members, respectively, with the hook members being adapted to hook into the stake well at the rear end of the upstanding side walls of the bed of the pickup truck or over the upper edge of the standard tailgate of the pickup truck. The hook members are preferably pivotally attached to the elongate support members, so that the downwardly extending end of the hook can rotate about a substantially vertical axis through or adjacent the elongate support members. In addition, the hook members are attached to the elongate support members by means which allow limited translational movement of the hook members in a direction parallel to the vertical support members. The free ends of the hook members extend downwardly so as to be adapted to engage the stake well at the rear end of either side of the bed of the pickup truck or to hook over the top of the conventional tailgate of the truck.

A load carrying platform is mounted to the stationary frame by appropriate attachment means which allows the platform to move up and down along the support members. Preferably, the attachment means comprises a carriage which is slidably mounted on the support members, and the platform is securely attached to the movable carriage.

Means are provided for moving the load carrying platform up and down between its lowered position adjacent the ground and elevated position raised from the ground. Various means can be utilized for raising and lowering the platform including air or hydraulic rams, electric motors, or manually operated cranks. Preferably, the means for raising and lowering the platform comprises at least one hydraulic ram connected between the stationary frame and the platform or the means for movably attaching the platform to the stationary frame. An electrical pump driven from the truck's electrical system pressurizes the hydraulic fluid used in operating the rams.

Additional objects and features of the invention will become apparent from the following detailed description, taken together with the accompanying drawings.

THE DRAWINGS

Particular embodiments of the present invention representing the best mode presently contemplated of carrying out the invention are illustrated in the accompanying drawings, in which.

DETAILED DESCRIPTION OF THE ILLUSTRATED EMBODIMENTS

Figure 2:
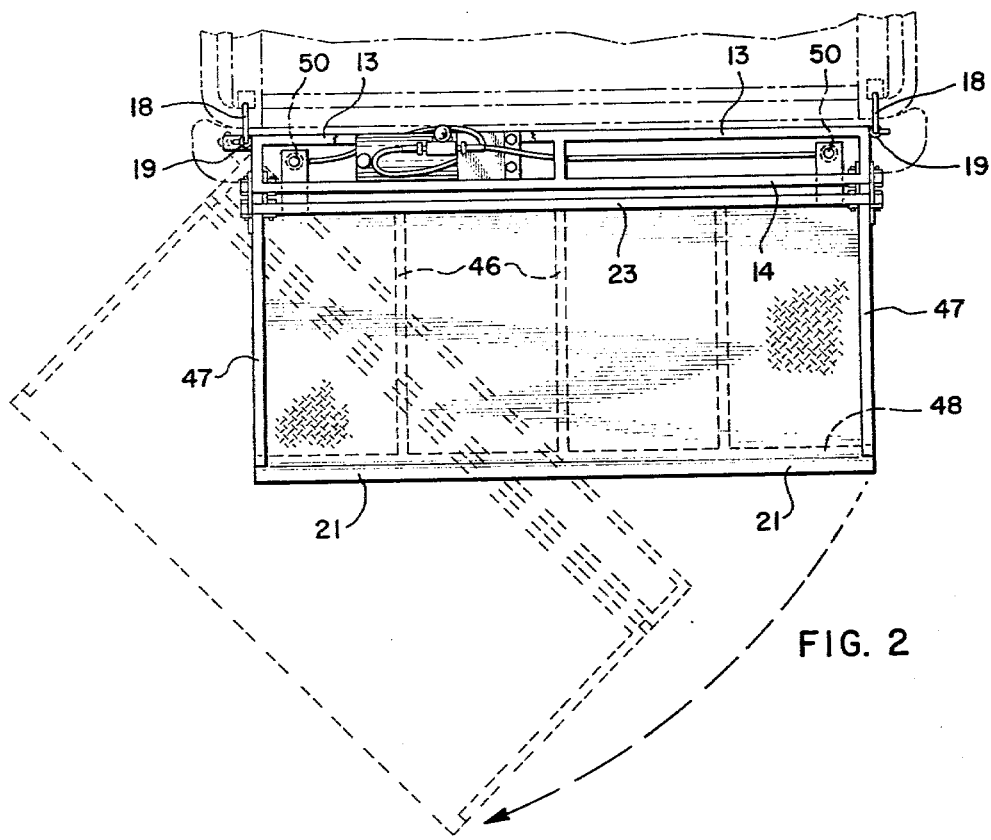
FIG. 2 is a top plan view taken along line 2—2 of FIG. 1 showing, in phantom, a swinging movement of the unit about one of its ends so as to readily provide open access to the rear end of the truck bed.

A preferred embodiment of the lift unit of this invention is shown in FIGS. 1-3 and 5-9 of the drawings as the unit is attached to the rear end of the bed of a pickup truck. The rear end of the pickup truck is shown in phantom. A slightly modified lift unit is shown in FIG. 4. Like parts of the two embodiments will be referred to by the same reference numerals throughout the following description. For purposes of clarity, the left hand side of the unit as it is mounted on the truck is the side closest to the driver's side of the truck, and the right hand side is the side closest to the passenger's side of the truck. The front side of the unit is that side adjacent or facing the rear end of the truck bed, and the back or trailing side of the unit faces away from the back of the truck.

The lift unit comprises a stationary support structure including a pair of spaced apart, essentially vertically disposed, elongate support structures forming the left and right hand sides of the unit. In the preferred embodiments illustrated in the drawings, the support structures at the sides of the unit are of generally identical construction so that a description of one will generally fit the other. Each of the support structures at the sides of the unit comprises a pair of elongate, upright post members 10 and 11 which have a square cross-sectional shape. The post members 10 and 11 are positioned in facing relationship, but slightly spaced apart, with the rearward post member 11 being spaced behind the forward post member 10. The post members 10 and 11 are connected firmly together by relatively short connecting members 12. As illustrated, the connecting members are positioned at the tops of the post members 10 and 11 as well as near the bottoms and intermediate the ends of the post members 10 and 11. The two pairs of post members 10 and 11, thus form substantially vertically disposed, rectangular side frames at the respective sides of the lift unit.

The vertically disposed, elongate support members, i.e., the side frames formed by post members 10 and 11 as shown in the drawings, have an elongate, transverse cross member extending from one side of the unit to the other between the upper ends of the side frames. As illustrated, the transverse cross member comprises a pair of elongate tubes 13 and 14 which have square cross-sectional shapes. Tube 13 connects the tops of post members 10 of the end frames, and tube 14 connects tops of post members 11 of the end frames. The tubes 13 and 14 form the top of the stationary support structure. Added rigidity of the stationary support structure is achieved by providing a second transverse cross member connected between the bottoms of the side frames. As shown in the drawings, the second transverse cross member comprises tubes 15 and 16 which again have a square cross-sectional shape. Tube 15 connects the bottoms of the forward post members 10 of the end frames, and tube 16 connects the bottom portion of the rearward post members 11 of the end frames. As best shown in FIGS. 1, 3, 7, and 8, the lower ends of the rearward post members 11 of the end frames, respectively, extend downwardly slightly beyond the corresponding ends of the forward post members 10. The lower ends of the forward post members 10 are adapted to rest on the upper surface of the bumper of the pickup truck as does the tube 15 which connects the lower ends of post members 10. The connecting member 12 which connects the lower ends of the forward post members 10, respectively, to the rearward post members 11 are also adapted to rest on the upper surface of the bumper of the truck. The portion of the lower ends of the rearward post members 11 which extend below the corresponding ends of the forward post members 10 are shown by the reference numeral 17 in FIGS. 1, 3, 8, and 9. The sections 17 of the rearward post members 11 are adapted to abut the outwardly facing side of the rear bumper of the truck as shown.

Figure 1:
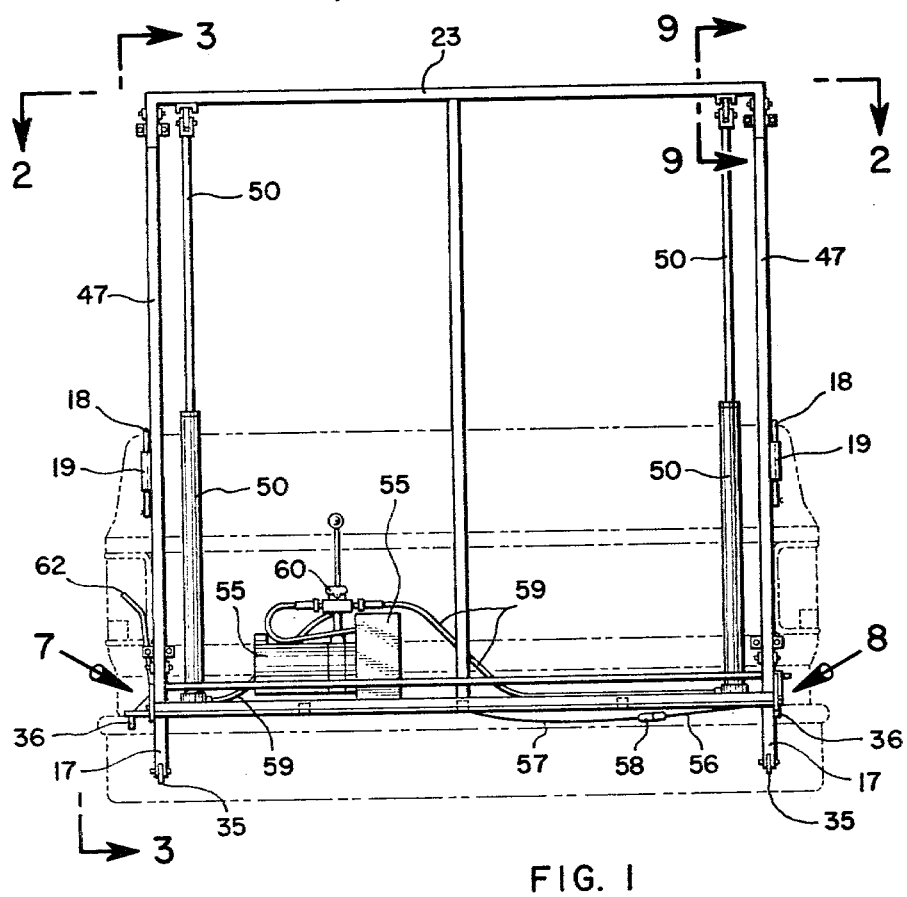
FIG. 1 is an elevational view of a lift unit in accordance with the present invention, showing a pickup truck on which the unit is mounted in phantom.
Figures 3, 4, 5, 6:
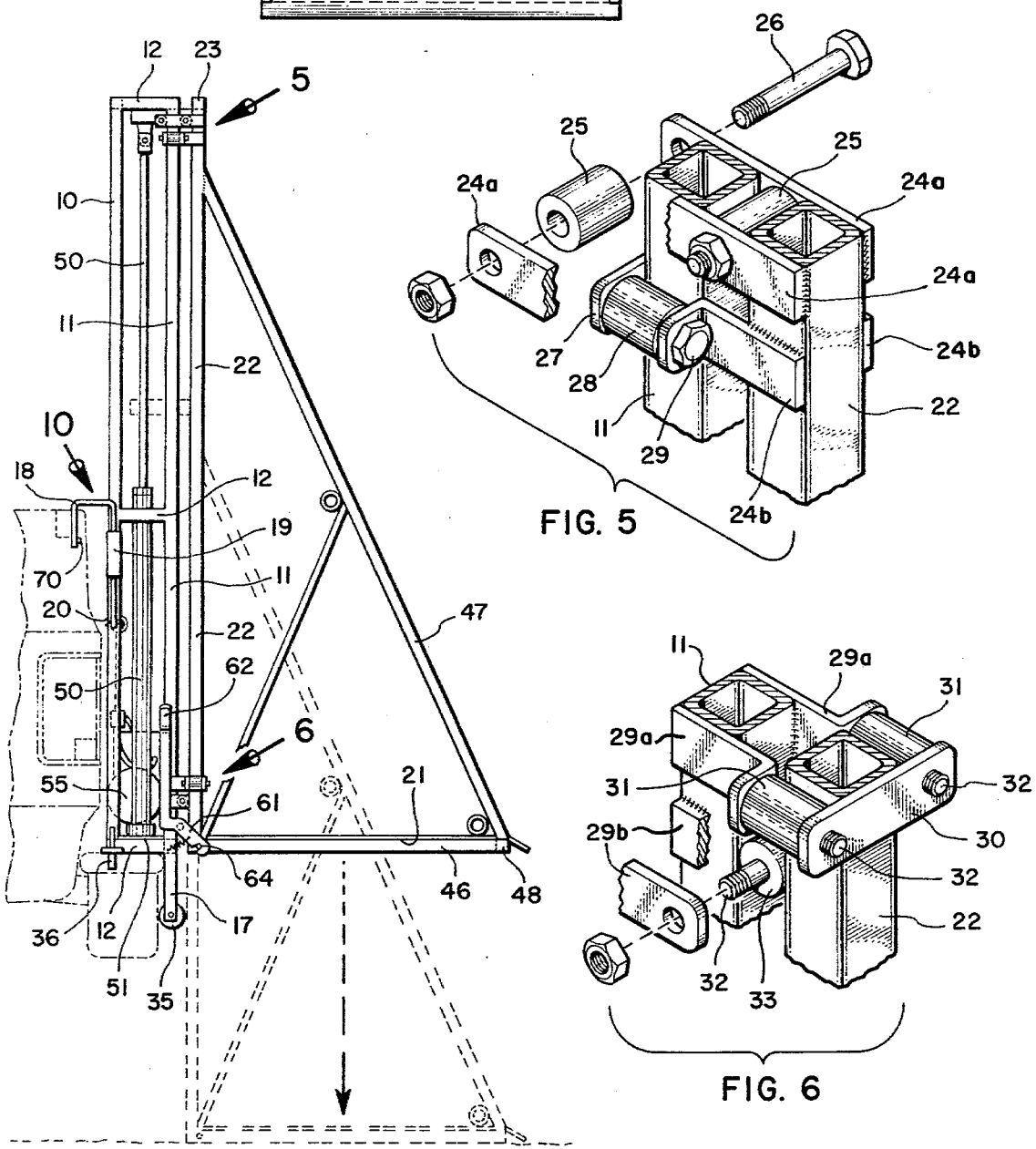
FIG. 3 is an end elevational view taken along line 3—3 of FIG. 1, showing the platform in an elevated position, with a lowered position of the platform being shown in phantom.
FIG. 4 is a top plan view of a lift unit similar to the one shown in FIG. 1, except that the unit of FIG. 3 extends only part way across the width of the tailgate of the truck.
FIG. 5 is a partial perspective view of the top roller assembly on the carriage as shown at the arrow 5 in FIG. 3.
FIG. 6 is a partial perspective view of the lower roller assembly on the carriage as shown at the arrow 6 in FIG. 3.

The upper ends of the post members 10 and 11 extend well above the truck bed and the upper edge of the sides of the bed as shown in FIGS. 1 and 3. A pair of hook members 18 are attached to the vertically disposed, elongate support members, i.e., the side frames of the unit comprising the post members 10 and 11. As illustrated, the hook members 18 are attached to the forward post members 10, respectively, at a distance upwardly from the lower ends thereof corresponding to the height of the top edge of the bed and conventional tailgate of the truck. The hook members 18 are adapted to hook into the stake well at the rear end of the upstanding side walls of the bed of the pickup truck as illustrated in FIGS. 1-4, and 10. When the lift unit is designed to fit all the way across the back of the pickup truck, the hook members 18 on the opposite sides of the unit are adapted to fit into the respective stake wells at the opposite sides of the bed of the truck. The lift unit need not, however, be as wide as the bed of the truck. In FIG. 4, a lift unit is shown which does not extend across the entire width of the rear end of the truck. As illustrated, the hook member 18 on the left hand side of the lift unit engages the stake well in the side of the truck, and the hook member 18 on the right hand side of the unit hooks over the upper edge of the conventional tailgate on the truck. It should be recognized that the hook members of the unit shown in FIG. 4 could have been reversed, i.e., the right hand member 18 could engage the right hand stake well while the left hand member 18 could be hooked over the tailgate.

The hook members 18 are preferably pivotally attached to the frames at the opposite sides of the lift unit. In addition, the hook members 18 are preferably attached to the lift unit by means which allow the hook members 18 a limited amount of up and down movement parallel to the sides of the lift unit. The up and down movement allows the hooks to be lifted upwardly to clear the stake well and/or the upper edge of the tailgate of the truck as the unit is being mounted on the rear end of the truck. As illustrated, the hook members 18 are formed from a rod bent into a substantially inverted "U" shape, with its legs extending downwardly substantially parallel to each other. One of the legs of each hook member 18 is pivotally attached to the respective forward post member 10 at the sides of the unit. Conduits 19 having inside diameters somewhat larger than the diameters of the rods from which the hook members 18 are formed, are attached, such as by welding, to the rearward post members 10, respectively. The other legs of the hook member 18 fit longitudinally within the conduits 19. Thus, the hook members may pivot about their respective legs which engage the conduits 19, and the hook members can be moved up and down by sliding the legs thereof longitudinally through the respective conduits 19. To avoid having the hook members slide completely out of the conduits 19, cotter pins 20 are advantageously provided near the lower end of the respective legs of the hook members 18 which engage the conduits 19. Thus, when the hook members 18 are raised, the cotter pins 20 will ultimately come into contact with the lower ends of the conduits 19 and prevent further upward movement of the hook members 18.

Figure 7:
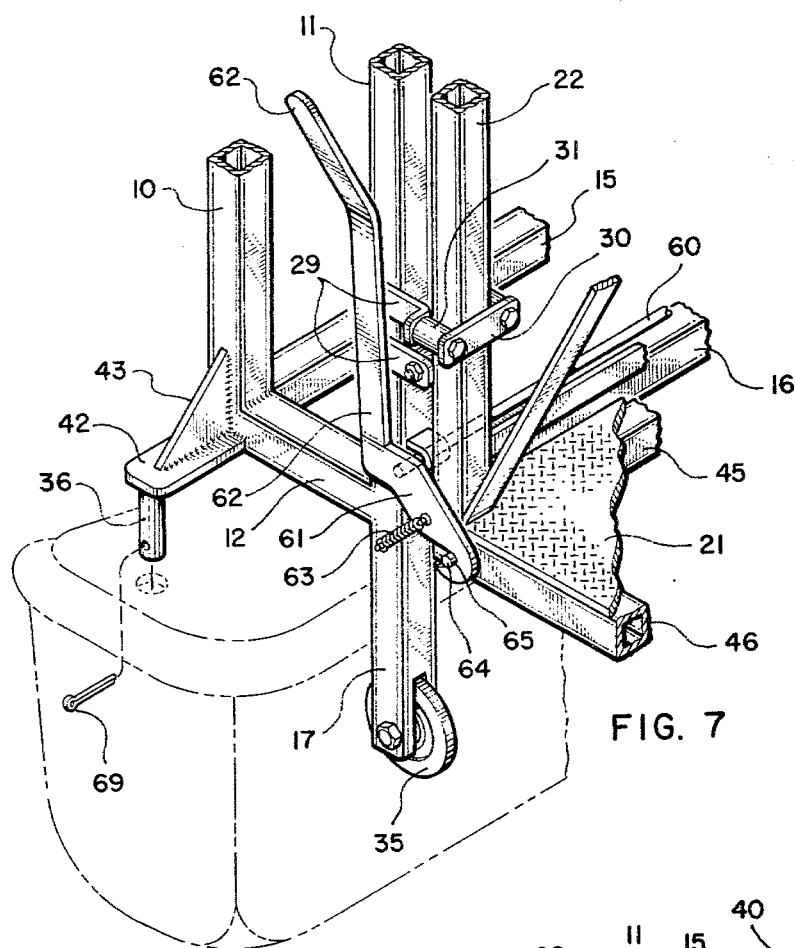
FIG. 7 is a partial perspective view of the lower left hand end portion of the lift unit as shown by the arrow 7 in FIG. 1, showing the platform in its elevated position.
Figure 8:
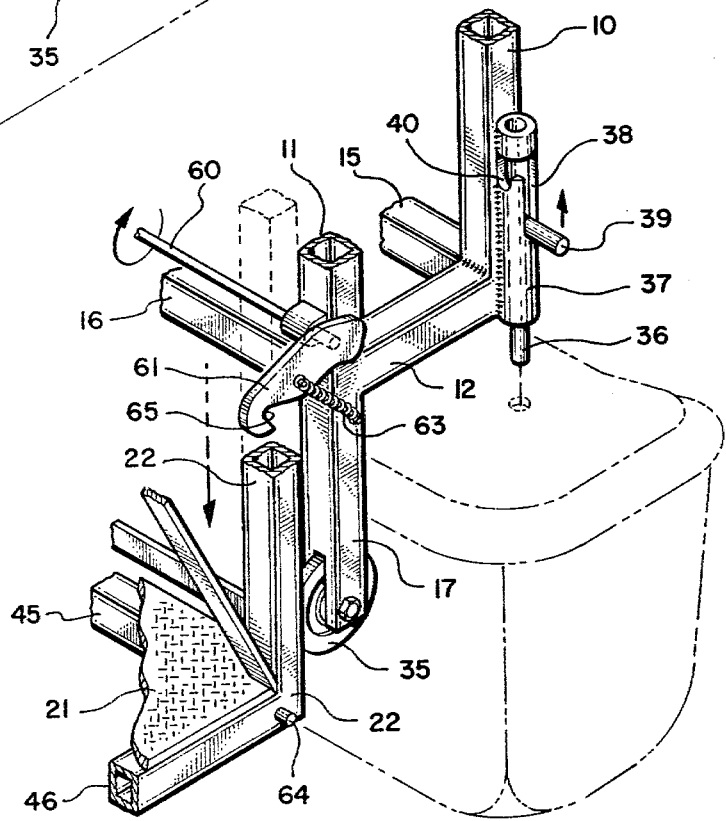
FIG. 8 is a partial perspective view of the lower right hand end portion of the lift unit as shown at the arrow 8 of FIG. 1, showing the platform in a translational position intermediate its raised and lowered positions.

A load carrying platform 21 is mounted by appropriate means to the stationary support structure whereby the platform 21 is supported from the support members, i.e., the side frames formed by the post members 10 and 11 so that the platform is movable along the support members. As illustrated, the means for mounting the platform 21 to the stationary support structure comprises guide and support means in the form of a carriage. The carriage is interconnected between the platform 21 and the rearward post members 11 of the support members at the sides of the unit, with the carriage being adapted for sliding movement up and down along the rearward post members 11. The carriage as shown in the drawings comprises a pair of substantially vertically disposed elongate columns 22 as best shown in FIGS. 3, 7, and 8. The columns 22 are made of square-shaped tubing similar to that of the post members 11 and 12. The columns 22 are attached at mutually respective ends thereof to the platform 21 so as to extend upwardly from the platform in side-by-side relationship with the respective rearward post members 11 of the side frames of the stationary support structure.

The uppermost end portions of the columns 22, respectively, are provided with upper connecting members firmly attached to the columns 22 and slidably mounted to respective rearward post members 11. The lower portions of the rearward post members 11 have lower connecting members firmly attached thereto which are slidably mounted to the elongate columns 22, respectively.

As best illustrated in FIG. 5, the upper connecting members comprise two pair of bracket members 24a and 24b welded to the sides of the respective elongate column 22. The upper pair of brackets 24a extend beyond the sides of the rearward post member 11, and rollers 25 are mounted between the brackets 24a, so that the rollers 25 make rolling contact with the sides of the post member 11 which face to and away from the column 22. As shown, the rollers 25 are positioned on respective bolts 26 which extend between the brackets 24a. The rollers 25 are advantageously of the ball bearing or roller bearing type. The lower pair of brackets 24b extend outwardly from the sides of column 22 to the side of the post member 11 which faces the column 22. Ears are formed on the ends of the lower brackets 24b and extend substantially perpendicularly from the brackets in a direction away from the post member 11. A bracket plate 27 is positioned adjacent the side of post member 11 which faces away from the column 22. The bracket plate 27 is aligned with the ears on the lower bracket 24b, and a pair of rollers 28 are mounted between the bracket plate 27 and the ears of the lower bracket 24b using a bolt 29 through openings in the ears and engaging threaded openings in the bracket plate 27. The rollers 28, which are advantageously of the ball bearing or roller bearing type, make rolling contact with two sides of the post member 11, and, as can be seen from the drawings, the upper end of the column 22 is effectively mounted to the post member for parallel movement of the column 22 along the post member 11.

As illustrated in FIG. 6, the lower portion of the rearward post member 11 has two pair of brackets 29a and 29b welded to the sides thereof. The upper brackets 29a extend outwardly from the sides of the post member 11 to the side of the column 22 which faces the post member 11. Ears are formed on the ends of the upper bracket 29c and extend substantially perpendicularly from the brackets in a direction away from the column 22. A bracket plate 30 is positioned along the opposite face of column 22 in alignment with the ears on the upper brackets 29a. A pair of rollers 31 are mounted between the bracket plate 30 and the ears of the upper bracket 29a using bolts 32 in a manner similar to the mounting of rollers 27 on the upper end of the column 22. The rollers 31 make rolling contact with the sides of column 22. The lower bracket 29b extends just sufficiently beyond the sides of the post member 11 so that a single roller 33 can be mounted therebetween in a manner similar to the mounting of rollers 25 on the upper end of column 22. The roller 33 makes rolling contact with the face of column 22 facing the post member 11. An additional roller could be provided for the outer face of the column 22 by extending the brackets 29b. However, the load on the platform 21 produces only a torque in column 22 towards the post member 11. An opposite torque is not produced to any great extent during the operation of the lift unit, and thus, the roller on the outer face of column 22 for the mounting means at the lower end of post member 11 is not required. The rollers 31 and 33 are similar to the rollers 25, and as explained hereinabove, are advantageously of the ball bearing or roller bearing type. The columns 22 are restrained at the lower end portion of the post members 11 for all movement except movement parallel along the post member 11.

In the illustrated embodiment, the guide and mounting means, including brackets 29 and associated rollers attached to the lower end portions of the rearward post members 11, are positioned adjacent to or slightly above the respective points where the lower connecting members 12 from the lowermost ends of the forward post members 10 are attached to the rearward post member 11. As explained hereinbefore, the forward post member 11 has an extension 17 extending downwardly along the face of the bumper of the truck. As shown in FIGS. 1, 3, 7, and 8, relatively small wheel members 35 are mounted at the lower end of the extensions 17, respectively. The wheels 35 are mounted for rotation about an axis extending through the lower ends of the pair of rearward post members 11. The wheel members 35 serve a dual purpose. As the platform 21 is being lowered, as best shown in FIG. 8, the sides of the columns 22 of the carriage make rolling contact with the wheel members 35. The wheel members 35 are positioned such that they do not make contact with the bumper of the truck, and, are, thus, free for rolling contact with the columns 22. In addition, where the platform is in its raised position, and the lift unit is dismounted from the truck, the wheels 35 are advantageously used to roll the lift unit from one place to another. The wheels 35 work just like the wheels of hand truck in this latter use. The unit itself is leaned backwards until only the wheels 35 touch the ground, and the unit is then either pulled or pushed over the ground rolling on the wheels 35.

Figure 9:
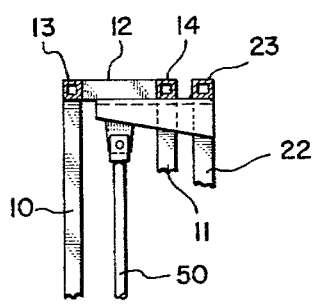
FIG. 9 is a partial cross-sectional view taken along line 9—9 of FIG. 1.

The bottom of the stationary support unit is, as explained above, adapted to rest on the upper surface of the bumper of the truck. The lower connecting members 12 as shown in FIGS. 8 and 9, together with the bottom member 15 of the frame and the extensions 17 of the rearward post members 11 form means for mounting the lower end of the stationary support unit to the bumper of the truck. The connecting members 12 and the bottom member 15 form a ledge-like abutment which rests on the top of the bumper, and the extensions 17 abut the face of the bumper to achieve correct positioning of the unit on the bumper. It has been found advantageous to include pin members 36 (FIGS. 1, 3, 7 and 8) attached to the bottom of the stationary unit. The pin members 36, which extend downwardly from the bottom portion of the stationary support unit which rests on the bumper, are adapted to engage corresponding openings in the bumper. The engagement of the pins 36 in the openings in the bumper prevent sliding movement of the stationary unit relative to the bumper. This completely eliminates any chance of the unit slipping backwards and off the bumper.

It has been found advantageous to adapt one of the pin members 36 so that it can be retracted from its corresponding opening in the bumper of the truck while the lift unit remains in place on the bumper of the truck. As shown in FIG. 8, the removable pin member comprises a relatively short section of conduit 37 welded to the side of the forward post member 10. The pin 36 is positioned longitudinally within the conduit and is sufficiently long to extend substantially into the conduit 37. A slot 38 is formed in the conduit, and the upper end of the pin 36 is adapted to receive the inner end of a handle bar 39 that fits through the slot 38 for sliding movement therealong. An offset notch 40 is formed in the conduit 37 adjacent to and opening into the top of the slot 38. The pin 36 is then easily and readily retracted from engagement with the opening in the bumper of the truck by lifting the handle bar 39 upwardly in slot 38 and then rotating the bar 39 into the slot 40, whereupon the pin 36 will remain in its retracted position until the above procedure is reversed.

The pin 36 on the opposite side of the lift unit from the retractable pin is preferably offset outwardly away from the side of the stationary unit by a distance of from about 1 to 5 or 6 inches. As best shown in FIG. 7, a flat lug 42 and brace member 43 are welded to the side of the forward post member 10, and the pin 36 extends downwardly from the free end of the lug 42. The main purpose of offsetting one of the pins 36 outwardly away from the side of the stationary unit and of adapting the pin 36 on the opposite side of the unit to be retractable is to adapt the lift unit as a whole to be pivotally swung away from the rear end of the truck while still attached thereto. In many instances, access to the rear end of the bed of the truck will be desirable without removing the lift unit from the truck. Such access is readily and easily accomplished by withdrawing the retractable pin 36 from its opening in the bumper of the truck, and disengaging the hook member 18 on the same side of the unit. The hook member is easily disengaged by raising it up until the end thereof clears the stake well or the end of the tailgate and then pivoting the hook member out of the way. The entire lift unit is then pivoted about the pin 36 and hook member 18 on the other side of the unit. This movement is shown in phantom in FIG. 2. By having the pin 36 about which the unit is pivoted offset as explained hereinabove, the lift unit can be pivoted completely away from the rear end of the truck. If the pin 36 is not offset as described, the side of the unit adjacent such pin has a tendency to bind itself against the corner of the back end of the truck as the unit is pivoted.

The lift unit can be further restrained to the bumper of the truck by providing an opening through the lower end of the non-retractable pin 36 (FIG. 7). A cotter pin 69 is then placed through the openings in the non-retractable pin 36 after such pin 36 has been engaged in its opening in the bumper of the truck. The opening in the pin 36 can also be adapted to receive a padlock, whereby the lift unit can be locked to the truck, mainly as a protection against theft of the lift unit.

The columns 22 of the carriage are preferably joined to each other at their top ends by a cross support member 23. A similar cross member 45 (FIGS. 7 and 8) joins the lower ends of the columns 22. Platform supporting beams 46 extend outwardly from the lower ends of the columns 22. Angled braces 47 are connected between the respective outwardly extending ends of the platform supporting beams 46 and the corresponding upper portion of the columns 22. The tread plate forming the platform 21 is welded to the supporting beams 46 and the cross member 45 at the back of the platform 21. A support beam 48 (FIGS. 2 and 3) can be provided under the outer edge of the platform 21 extending between the outwardly extending ends of the platform supporting beams 46.

The carriage, comprising the elongate, vertical columns 21 and cross beam 23 to which the platform supporting beams 45, 46, 47 are attached, is adapted to move up and down the rearward post members 11 of the stationary support structure as described hereinbefore. Various means can be used to move the carriage up and down in its proper motion. As illustrated, hydraulic rams 50 are connected between the stationary support and the carriage, so that as the rams are extended, the carriage moves vertically upward and as the rams are shortened, the carriage moves downwardly. In the embodiment shown in FIGS. 1-3 and 4-9, wherein the unit fits across essentially the entire back end of the bed of the pickup, two rams 50 are shown, one ram on each side of the lift unit. The feet of the rams 50 are firmly attached to a support plate 51 (FIG. 3) which spans the bottom cross beams 15 and 16 of the stationary support structure. The upper ends of the rams 50 are attached to a support bracket 52 (FIG. 9) extending outwardly from the top beam 23 of the carriage. With a narrower, smaller lift unit as shown in FIG. 3 one central ram unit 53 is used. Ram 53 is attached to the stationary support structure and the carriage in the same manner as that described for the rams 50.

An electrical hydraulic pump unit 55 is mounted on the bottom beams 15 and 16 of the stationary support structure and is adapted to be connected to the electrical system of the truck for drawing current from the battery of the truck. As illustrated, a cord 56 is shown coming from the electrical system of the truck and it connects with the electrical supply cord 57 to the hydraulic unit by means of a plug connection unit 58. When the lift unit is to be removed from the truck, the connection unit 58 is disconnected, and the cord 56 is left in place ready to be reconnected when the lift unit is reattached to the truck. Hydraulic fluid from the pump unit 55 is supplied to the rams 50 through appropriate lines 59 and control valve 60 (FIG. 1).

A latch system is advantageously provided to mechanically lock the platform in its raised position so that when a load is carried on the platform, the rams 50 do not have to support the load during the period between when the platform was lifted and when the platform is lowered. The latch system is adapted to support the load during the interim period between raising the platform and lowering the platform. As illustrated in FIGS. 7 and 8, a representative type latch system comprises a cross bar 60 extending from near the lower end of one side of the stationary support structure to near the lower end of the other side thereof. A pair of latch hooks 61 are attached to the ends of the cross bar 60 for pivotal movement about the axis through the cross bar 60. A lever handle 62 is attached to one of the latch hooks, as shown in FIG. 7. A spring 63 is attached between the hook members 61 and the stationary support structure for biasing the catch end of the latch 61 inwardly towards the stationary structure, and a stop is provided for limiting the inward movement of the catch end of the latch 61. Two lugs 64 are provided on the opposite sides respectively of the platform. The lugs 64 are in general alignment with the catch end of latch hooks 61, and when the platform is elevated the lugs 64 first force the catch ends of the hooks 61 outwardly until the lugs are engaged by the notches 65 in the latch hooks 61. Once engagement of the lugs 64 is achieved in the notches 65 of hooks 61, the spring biasing force holds the hooks 61 against the lugs 64, and the engagement of the lugs 64 prevents downward movement of the platform. Thus, in operation, the platform with its load is lifted until the hooks 61 engage the lugs 64. Thereupon, the hydraulic pump unit 55 can be turned off, and the load is maintained indefinitely in the elevated position, with the hook members 61 holding the load up. When the load is to be released, the hydraulic pump unit is activated, and the platform raised slightly so as to relieve the hooks 61 from carrying the load on the platform. The handle 62 is then rotated to pivot the catch ends of the hooks 61 away from the lugs 64 on the platform. At this point, the pump unit 55 is used to lower the platform. When a load has been lifted into the elevated position, it can be strapped down to the platform and carriage and carried in the elevated position indefinitely, and there is no need to move the load into the bed of the truck.

Figure 10:
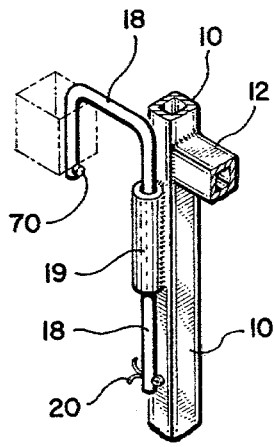
FIG. 10 is a partial perspective view showing a typical hook member and its attachment to the stake well in the pickup truck.

In a preferred embodiment of the hook members 18 used in attaching the unit to the truck, as shown in FIG. 10, a lateral projection 70 is provided at the end of the free leg of the hook member 18. When the hook member 18 is engaged in the stake well in the truck, the projection engages the lower end of the stake well and prevents unintentional withdrawing of the hooks 18 from the stake wells. A slight tipping of the top of the unit toward the bed of the truck will release the hook members 18 so that they can be lifted up out of the stake wells when the unit is being removed from the truck.

As will be evident from the above description, the lift unit is essentially a totally self-contained unit. In some instances, the hydraulic pump unit could be installed semi-permanently or permanently on the truck itself. Nevertheless, the lift is a single unit which is easily and readily removed from and attached to the truck. No tools of any kind are needed in attaching the lift unit to the truck or in removing the unit from the truck. The bed of the truck needs no modifications except provision of appropriate openings in the bumper to receive the pins 36 of the unit. The original tailgate of the truck need not be removed, and in a matter of a few seconds, the unit can be removed from the truck, with the truck being restored to its essentially original condition.

Although preferred embodiments of the invention, which are presently contemplated as the best mode of carrying out the invention, have been illustrated and described, it is to be understood that the present disclosure is made by way of example and that variations are possible without departing from the subject matter coming within the scope of the following claims, which subject matter I regard as my invention.

I claim:

1. A detachable lift unit adapted for readily being attached to and detached from the rear end of the bed of a pickup truck, said lift unit comprising:
   a stationary support structure including a pair of spaced apart, essentially vertically disposed, elongate, support members, and means for releasably mounting the lower ends of said support members to the bumper at the rear end of the truck;
   a pair of hook members, said hook members being attached to the vertically disposed, elongate support members, respectively, and adapted to hook into a well at the rear end of the upstanding side walls of the bed of the pickup truck or over the upper edge of the tailgate of the pickup truck;
   a load carrying platform;
   means for supporting said platform from the pair of support members of said stationary frame so that the platform is movable along the pair of support members between a lowered position and an elevated position; and
   means for moving said load carrying platform from its lowered position to its elevated position and vice-versa.

2. A detachable lift unit in accordance with claim 1, wherein the stationary support structure further includes an elongate, transverse cross member extending between the upper ends of the support members thereof.

3. A detachable lift unit in accordance with claim 2, wherein each of said vertically disposed, support members comprises a pair of elongate, parallel post members, with the rearward post member being spaced behind the forward post member and connected to the forward post member by spaced apart connecting members to form vertically disposed rectangular side frames at the sides of the lift unit, said hook members are pivotally attached to the mutually respective forward post members of said side frames, and said means for supporting said platform comprises guide and support means interconnected between said platform and said rearward post members and adapted for sliding movement along said rearward post members.

4. A detachable lift unit in accordance with claim 3, wherein said guide and support means comprises a pair of vertically disposed elongate columns attached at mutually respective ends to said platform and extending upwardly from said platform in side-by-side relationship with the respective rearward post members of said side frames, wherein the uppermost ends of said elongate columns, respectively, are provided with upper connecting members firmly attached thereto, said upper connecting members being slidably mounted to said rearward post members, respectively, said rearward post members, respectively, having lower connecting members firmly attached to the lower portion thereof, said lower connecting members being slidably mounted to said elongate columns, respectively.

5. A detachable lift unit in accordance with claim 4, wherein the elongate columns and the rearward post members are square in cross-section, the upper connecting members comprises four rollers mounted adjacent the four respective sides of the respective rearward post members for rolling movement therealong, and each of the lower connecting members comprises at least three rollers mounted, respectively, adjacent at least the three sides of the respective elongate columns closest to rearward post members.

6. A detachable lift unit in accordance with claim 3, wherein the lower ends of the forward post members are adapted to rest on the upper surface of the bumper of said pickup truck, and the lower ends of the rearward post members extend downwardly beyond the ends of the lower ends of the forward post members so as to be adapted to abut the back side of the bumper.

7. A detachable lift unit in accordance with claim 6, wherein each of the lower ends of the rearward post members is provided with a roller or wheel, said roller or wheel being mounted to the rearward post member for rotation about an axis extending through the lower ends of the rearward post members.

8. A detachable lift unit in accordance with claim 6, wherein pin members are attached to the lower ends, respectively, of the forward post members, said pin members being adapted to be received in corresponding openings in the upper surface of the bumper of said pickup truck.

9. A detachable lift unit in accordance with claim 8, wherein means are provided for pivotally attaching the hook members to the forward post members, respectively, in such manner that the hook members are also adapted to move up and down parallel to the longitudinal length of said forward post members.

10. A detachable lift unit in accordance with claim 9, wherein the hook members comprise inverted U-shaped members and one of the means for pivotally attaching the hook members to the post members comprises conduits attached along the post members and adapted to receive one of the downwardly extending legs of the respective hook members.

11. A detachable lift unit in accordance with claim 9, wherein one of the pin members is slidably mounted to its respective forward post member for longitudinal movement of the pin along the side of the post member, whereby when the movable pin is withdrawn from its opening in the bumper of the truck and the hook member associated with the same side of the lift unit is disengaged from the truck, the lift unit can be pivoted about the pin and hook member on the other side thereof, so that the lift unit is rotated away from the back of the pickup truck to give access thereto.

12. A detachable lift unit in accordance with claim 1, wherein latch means are provided in combination with the stationary support member for mechanically releasably latching the platform to the stationary support member when the platform is in its elevated position.

13. A detachable lift unit in accordance with claim 12, wherein the means for moving the load carrying platform comprises at least one hydraulic ram, with one end of the ram being attached to the stationary support structure and the other end thereof being attached to the means for supporting the platform from the support members of said stationary support structure.

14. A detachable lift unit in accordance with claim 1, wherein the ends of the hook members, which are adapted to hook into the stake well, have a lateral projection therefrom adapted to engage the bottom of the stake well.

15. A detachable lift unit in accordance with claim 1, wherein the hook members are pivotally attached, respectively, to said support members.

* * * * *